Figure 1:
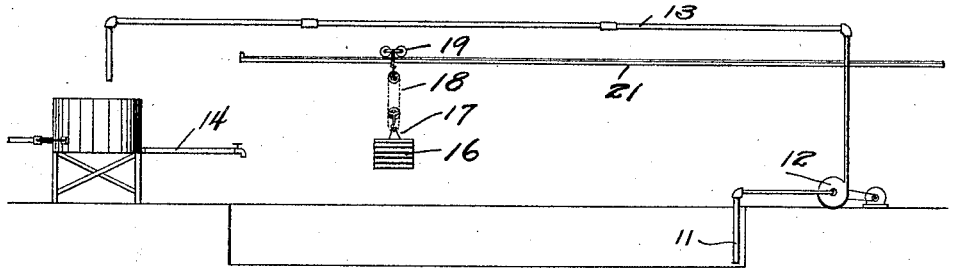

H. N. WOLFF.
METHOD OF PRESERVING OLIVES.
APPLICATION FILED SEPT. 2, 1919.

1,393,873.

Patented Oct. 18, 1921.

Witness:
C. S. Evans.

INVENTOR.
HENRY N WOLFF.
BY White & Rost
his ATTORNEYS.

UNITED STATES PATENT OFFICE.

HENRY N. WOLFF, OF OROVILLE, CALIFORNIA, ASSIGNOR TO SUNICAL PACKING COMPANY, OF SAN FRANCISCO, CALIFORNIA, A CORPORATION OF CALIFORNIA.

METHOD OF PRESERVING OLIVES.

1,393,873.  Specification of Letters Patent.  Patented Oct. 18, 1921.

Application filed September 2, 1919. Serial No. 321,107.

*To all whom it may concern:*

Be it known that I, HENRY N. WOLFF, a citizen of the United States, and a resident of Oroville, county of Butte, and State of California, have invented a new and useful Method of Preserving Olives, of which the following is a specification.

My invention relates to a process for preserving ripe olives.

An object of the invention is to provide a method of preserving olives which is more rapid and more economical than those methods now practised.

Another object of the invention is to provide a method of preserving olives in which the several steps are so standardized that unskilled labor may be substituted in large part for the highly skilled picklers now required.

Another object of the invention is to provide a method of preserving olives in which the solutions are maintained at a constant strength and temperature and the olives so handled through the solutions that one man can produce a finished product in quantities now requiring several men.

Other objects and advantages of the invention together with the foregoing will be set forth in the following description of the preferred process and the preferred embodiment for practising the same, which is illustrated in the drawings accompanying and forming part of the specification. It is to be understood that I do not limit myself to the showing made by the said description and drawings, as I may adopt variations of my preferred form within the scope of my invention as set forth in the claims.

In the drawings, Figure 1 is an elevation, diagrammatic in form, showing an apparatus with which my method may be performed.

Figure 2:
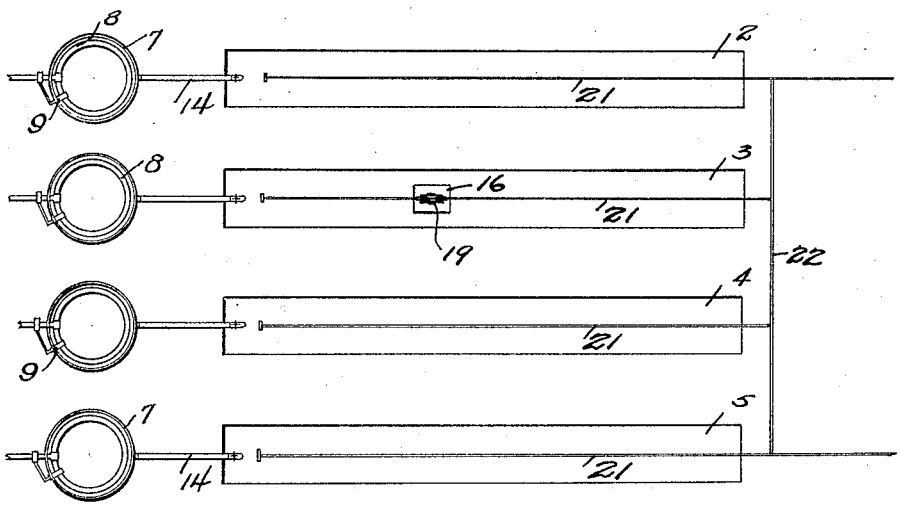

Fig. 2 is a plan view, in diagram, of the apparatus.

The method of preserving olives now in common use comprises the treatment of the olives in bulk in vats, the treating liquids being piped to the vats, and afterward withdrawn and for the most part wasted. The olives are then taken out of the vats, brined and packed. This method produces a satisfactory olive when performed by skilled workmen, but is wasteful of water and solution and is very slow.

According to my process, the olives are first graded for size and unit lots of them are charged into containers comprising perforated baskets. The baskets are then sunk in a vat containing a lye solution of suitable strength, preferably 2% and allowed to remain a given time, preferably about three hours. Treating with this solution is largely for the purpose of cutting the outer skin of the olive for the coloring effects. During this period, the lye solution is in circulation through the vat and over steam coils which maintain the solution at a given temperature, preferably about 70° Fahrenheit. The solution passes through the perforated walls of the basket and flows about the olives therein which are moved about occasionally to permit an even action of the solution, by an air stirrer of known form, inserted into the vat.

After exposure to this solution for the requisite time, the baskets are removed and sunk in a vat containing water which is also kept circulating and at a constant temperature of preferably about 60° Fahrenheit. The olives are stirred sufficiently to insure a thorough washing, and the baskets are then lifted out and immersed in a vat containing a relatively weak solution of lye preferably 1%, and at a temperature of about 70° Fahrenheit, and allowed to remain in this solution with occasional stirring until the bitter elements have been entirely removed by the neutralization of the acid in the olive. Ordinarily this will require about five hours. After treatment of the olives in the second lye solution the baskets are lifted out and immersed in a second water bath and allowed to remain there until the olives are freed from all the caustic which will require twenty-four hours or more according to the texture of the olives being treated.

After emerging from the wash water, the olives are put into brine storage tanks until packed.

The strength of the lye solution may be kept at the required point, tests by titration being made as desired. Fresh water may be added to the washing vats as required. There is therefore the highest economy in water and solution.

It will be noted from the above, first: that the fluids through which the olives have passed are kept circulating through the respective vats and are maintained at substantially constant temperatures. Second: that a given lot of olives is handled as a unit through the lye and washing fluids being transferred in its container or basket out of one and into another, as its own requirements dictate. Third: that a large number of such unit lots, limited only by the size of the vats, may be in course of treatment at one time, each unit entirely independent of any other unit, and a continuous succession of units being kept moving through the vats in which the same liquid is used over and over again.

A typical plant for practising my process is illustrated in the drawings. Four vats 2, 3, 4 and 5 of appropriate size are arranged side by side, and may conveniently be placed below the floor level. Preferably the vats are long, so that a number of unit lots of olives, each in its own container or basket may be treated in the vat at the same time.

At one end of each vat is a tank 7 in which a steam coil 8 is disposed, for the purpose of heating the liquid in the tank. Suitable automatic temperature regulating means 9 of well known type may be used in connection with the heating means to regulate the admission of steam into the coils.

A conduit 11 opening at the bottom of one end of the vat and connected into a pump 12 driven by any suitable means, and which is connected with the tank by conduit 13, and a valve controlled pipe 14 connecting the tank with the vat, provide means for circulating the liquid in the vat through the tank and over the heating coils. Thus a steady flow of liquid raised to the proper temperature is maintained through the tank. The olives are handled in baskets 16 preferably constructed with slatted sides and bottom to permit free passage of the liquid when the basket with its load of olives is immersed in the liquid of the vats. Each basket is provided with a bail or sling 17 with which it may be suspended by a chain block 18 from the carriage or trolley 19 adapted to run upon an overhead trackway 21 located longitudinally above each vat. At one end of the vat, a transverse trackway 22 provides means for shifting the loaded carriage from one longitudinal track to the next.

The baskets from the loading floor are picked up by the chain block carried over vat 2 and lowered into the solution. The block is then disengaged and a basket containing olives ready to be removed is picked up and shifted over onto the next track, and lowered into vat 3. As many blocks and trolleys as desired may be used.

After emerging from the last vat the baskets are conveyed to the brine storage tanks and discharged of their load.

I claim:

1. The method of preserving olives which comprises treating unit lots of the olives successively in circulating solutions of progressively lessened strength and of predetermined temperature, and washing each unit lot after each treatment.

2. The method of preserving olives which comprises charging a unit lot of the olives into a container, and alternately immersing the container in treating and washing fluids.

3. The method of preserving olives which comprises charging a unit lot of the olives into a container, and successively immersing the container in vats containing lye solutions of progressively lessening strength.

4. The method of preserving olives which comprises charging a unit lot of the olives into a container, and successively immersing the container in vats containing lye solutions of progressively lessening strength, and washing each unit lot after each immersion.

5. The method of preserving olives which comprises charging a unit lot of the olives into a container, alternately immersing the container in vats containing treating and washing fluids, and maintaining a circulation of said fluids through said vats during said immersion.

6. The method of preserving olives which comprises charging a unit lot of the olives into a container, alternately immersing the container in vats through which treating and washing fluids respectively at predetermined temperatures are circulated.

7. The method of preserving olives which comprises charging a unit lot of olives into a container, successively immersing the container in vats containing lye solutions of progressively lessening strength, washing the olives after each immersion, and then immersing the olives in brine.

8. That treatment of olives which consists of charging a foraminous container with a load of olives, and successively shifting the load of olives, without change of container, from one vat to another in successive order; the olives being subjected to a lye solution in the first vat, to a washing in water in the next vat, to a weaker lye solution in the third, and finally to a washing in water in the fourth.

In testimony whereof, I have hereunto set my hand at Oroville, Butte county, California, this 22nd day of August, 1919.

HENRY N. WOLFF.

In presence of—
GEORGE F. JONES.